(12) United States Patent
Guenther

(10) Patent No.: US 6,916,143 B2
(45) Date of Patent: Jul. 12, 2005

(54) SPEED HANDLE FOR WINCH

(76) Inventor: Marty Guenther, 1228 S. Spring, Independence, MO (US) 64055

( * ) Notice: Subject to any disclaimer, the term of this patent is extended or adjusted under 35 U.S.C. 154(b) by 0 days.

(21) Appl. No.: 10/617,933

(22) Filed: Jul. 11, 2003

(65) Prior Publication Data

US 2004/0120785 A1 Jun. 24, 2004

Related U.S. Application Data

(60) Provisional application No. 60/434,949, filed on Dec. 19, 2002.

(51) Int. Cl.[7] .................................................. B60P 7/08
(52) U.S. Cl. ....................... 410/103; 410/100; 410/156; 16/422; 74/545
(58) Field of Search ................................. 410/100, 103, 410/12, 96, 97, 156; 16/422, 426, 427, 429; 254/DIG. 3; 7/168; 74/544, 545, 548

(56) References Cited

U.S. PATENT DOCUMENTS

| | | | | |
|---|---|---|---|---|
| 3,517,575 A | * | 6/1970 | Roberson ....................... 81/73 |
| 5,433,565 A | * | 7/1995 | Chan ........................... 410/103 |
| 5,775,175 A | | 7/1998 | Salemno et al. |
| 5,791,844 A | * | 8/1998 | Anderson .................... 410/103 |
| D423,332 S | * | 4/2000 | Salter .......................... D8/359 |
| 6,056,488 A | * | 5/2000 | Depoy ......................... 410/100 |
| 6,102,637 A | | 8/2000 | Mocci |
| 6,139,233 A | * | 10/2000 | Wilsey ........................ 410/100 |
| 6,398,470 B1 | * | 6/2002 | Mosley ....................... 410/100 |
| 6,659,697 B1 | * | 12/2003 | Guenther .................... 410/103 |
| D485,658 S | * | 1/2004 | McMurtrey ................. D34/31 |
| 6,719,507 B2 | * | 4/2004 | Botelho ....................... 410/100 |

* cited by examiner

Primary Examiner—Stephen Gordon

(57) ABSTRACT

A speed handle for use in combination with a strap winch on a flat bed trailer. The straps used to secure loads on trailers can be 30 to 40 feet in length. There is no good way to wind these straps onto their winch when they are not in use. Currently the job is done by hand which is very slow and tedious. The speed handle engages a lug of the winch and allows the strap to be wound back onto the winch very quickly. The speed handle allows the winding to occur with only one hand so that another hand is free to guide the strap onto the winch drum.

8 Claims, 2 Drawing Sheets

SPEED HANDLE FOR WINCH

RELATED APPLICATIONS

Pursuant to 35 USC paragraph 119 (e)(I) applicant claims priority of a provisional patent application Ser. No. 60/434,949 filed Dec. 19, 2002.

BACKGROUND OF THE INVENTION

In the trucking industry it is desirable to be able to secure loads on flat bed trailers. A variety of techniques have been used to secure loads on a flat bed. The most commonly used method today is to secure the load with straps. These straps are positioned over a load and cinched down using winding winches secured to the trailer just below the bed. Once the load is removed the straps must be wound back up on a winch and this is currently done by hand.

The straps used to secure a load can be in excess of 30 feet in length and winding them up by hand is very time consuming. The winding winches used are fairly standard in the industry and include a cylindrical winding lug having four radial holes through the cylindrical wall and one hole through the center. The lug is typically used in conjunction with a cheater bar to provide extra leverage in cinching down the straps. Because of the problem with hand winding there has been some attempt to develop a tool to engage the lug to assist in winding up the straps.

U.S. Pat. No. 6,102,637 to Mocci shows one prior art approach to winding straps on a flat bed trailer. The device of Mocci uses a speed handle that engages the lug of a standard winch. The main problem with the device shown by Mocci is that it puts the operator in an impossible position under the truck and requires two hands to operate. Experiments have shown that to wind a strap the operator needs one hand to guide the strap onto the winch as it is wound. The device shown by Mocci requires the operator to stop frequently to straighten and guide the strap onto the winch.

A second prior art device is shown by Salemno et al U.S. Pat. No. 5,775,175. U.S. Pat. No. 5,775,175 shows a crank that would require only one hand to operate but the device shown also has several disadvantages. One problem with U.S. Pat. No. 5,775,175 is that it is complex to manufacture, requiring a number of individual parts and machining operations to build. Experience has also shown that the handle has a tendency to slip out of the lug holes in use, this is unacceptable to the user.

Thus it can be seen that there is a need for a strap rewind speed handle that is simple to manufacture and easy and reliable to use.

SUMMARY OF THE INVENTION

The present invention relates to a speed handle useful in connection with a strap winding winch. The speed handle provides a device that can wind a strap using only one hand such that an operator has a second hand free to guide the strap onto the winch such that the user does not have to stop winding frequently.

The device further provides a handle for winding utilizing a minimum of simple parts put together in a simple way that is inexpensive to build. The device provides a winding handle that will not easily slip out of the winch lug in use.

Further benefits of the current invention will become apparent in the following detailed description.

DETAILED DESCRIPTION OF THE DEVICE

Figure 1:
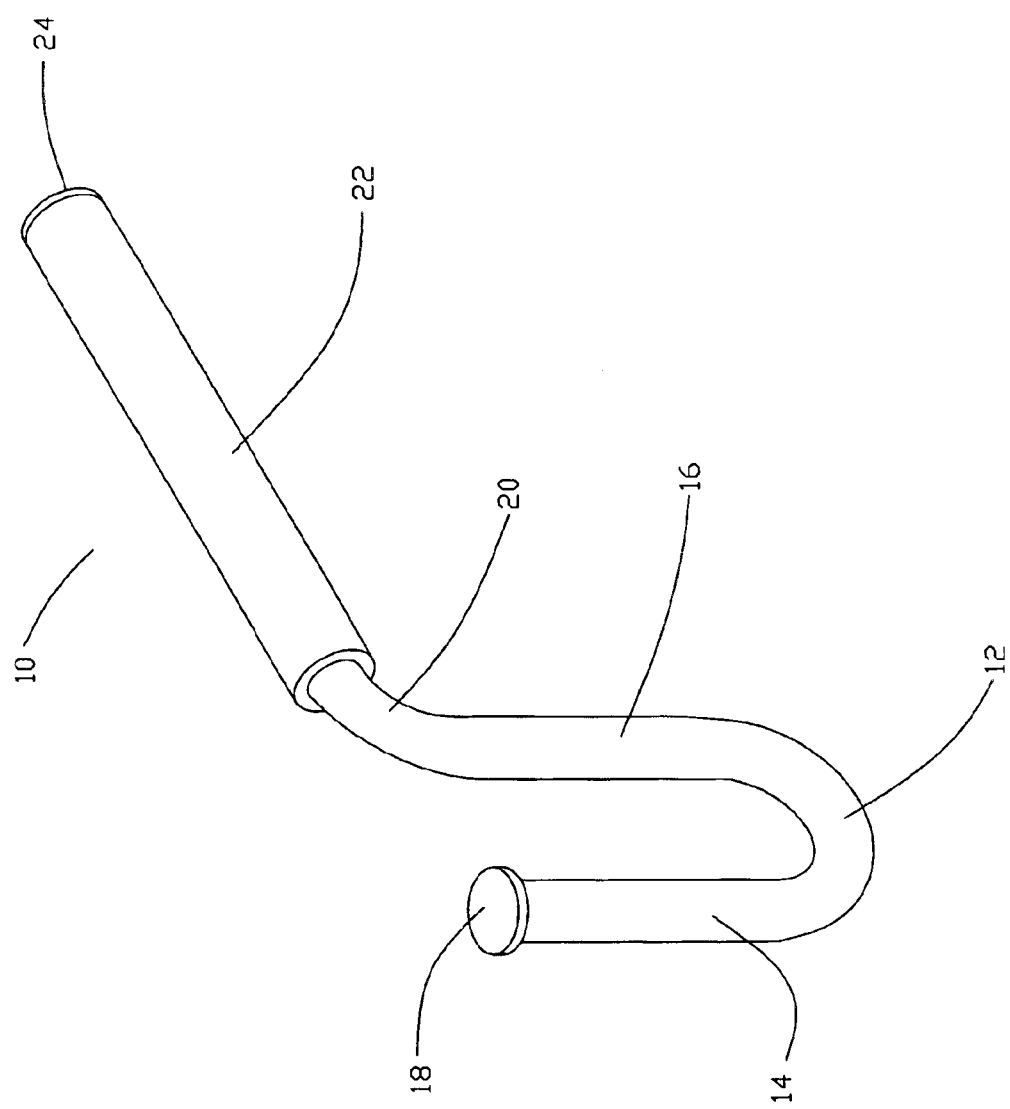
FIG. 1 shows a perspective view of the handle.

FIG. 1 shows a perspective view of the handle 10. A piece of round bar stock is bent into a shape useful as a winding handle 10. The shape includes a 180 degree bend 12 that creates an extension arm 14. The shape also includes an arm 16 and a handle portion 20. The end section of extension arm 14 can be capped with a circular cap 18 having a slightly larger diameter then the rest of the handle 10. The cap 18 can be attached to the extension arm 14 by welding.

The handle 10 also includes a handle portion roller 22 and a cap 24 attached to the handle portion 20.

Figure 2:
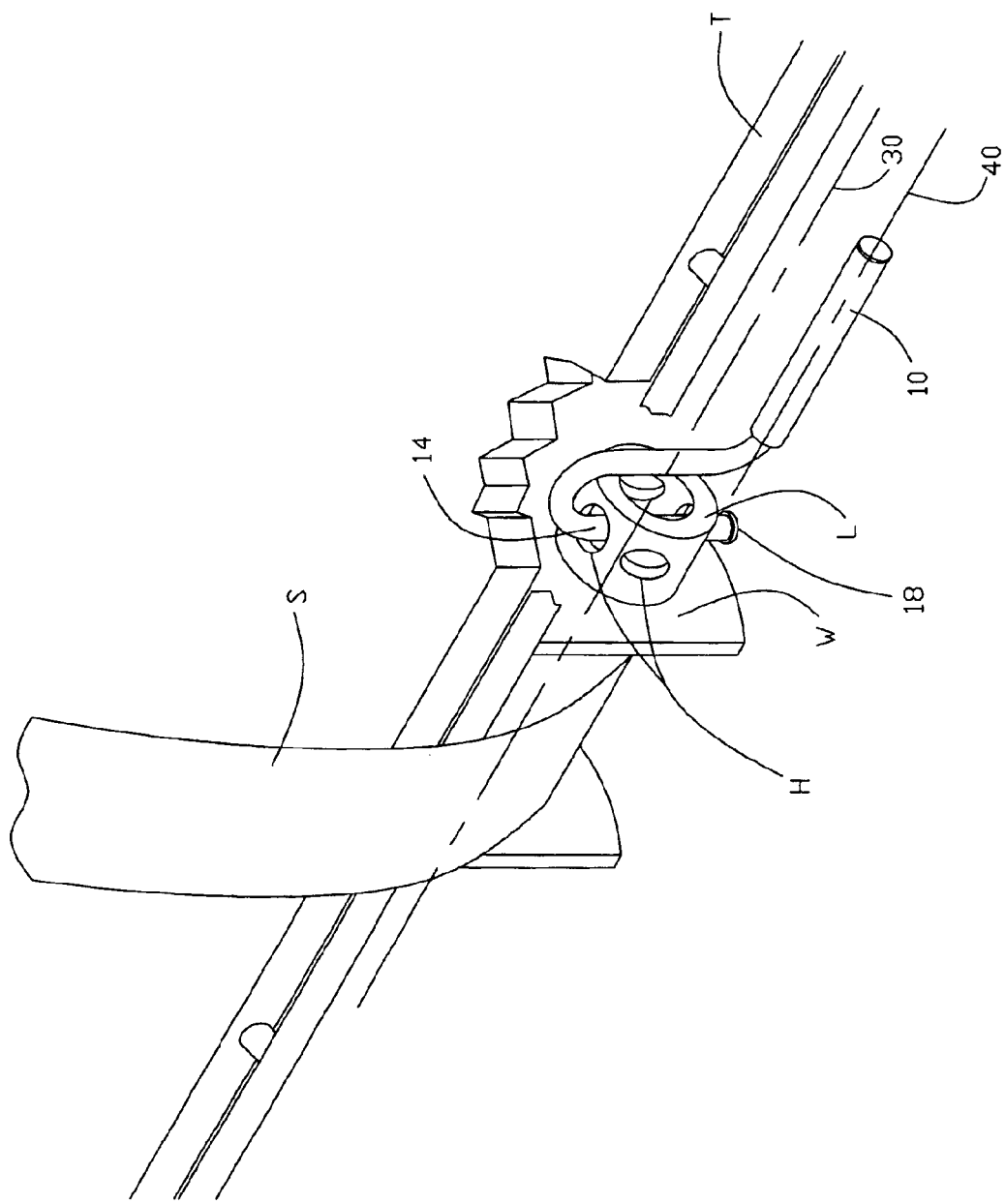
FIG. 2 shows a perspective view of the handle in use.

FIG. 2 shows the application of the handle 10, which can be used in conjunction with a strap (S) winding winch (W) attached to a flat bed trailer (T). The strap (S) is attached to a drum (not shown), a rotatable cylindrical lug (L) is attached to one end of the drum and is used to rotate the drum to wind up the strap (S). The handle 10 engages two holes (H) in a winch lug (L) which will typically have four total holes through the cylindrical wall. The handle 10 can then be used as a speed handle to wind up strap (S). The roller 22 is free to rotate about axis 40 through handle portion 20. The roller 22 can be made from steel or plastic and can be coated with rubber or other material to improve the ergonomic feel and usefulness of the handle 10. The roller 22 is held fast in the operator's hand and the handle portion 20 rotates inside the roller 22. This protects the operator's hand from friction that would otherwise occur with handle portion 20. As shown in FIG. 2 the diameter of the extension arm 14 is significantly smaller than the hole (H) and the diameter of the cap 18 can be just smaller than the holes (H).

In operation the handle 10 is inserted through two holes (H) on opposite sides of the winch lug (L). The extension arm 14 passes through the holes (H) as does the circular cap 18. The operator then grabs the roller 22, which is free to rotate on the handle portion 20 and rotates the handle 10 and lug (L) about the winch axis 30 extending through the lug (L). As the winch lug (L) is rotated strap (S) is wound up on the winch (W). The handle 10 only requires one hand to operate so the operator has a hand free to guide the strap (S) onto the winch (W). Experimentation has shown that the cap 18, which has a slightly larger diameter then the diameter of extension arm 14, will catch on the edge of a hole (H) if the handle 10 starts to slip out of the hole (H) while the handle 10 is rotating and thus maintain the handle 10 in winding engagement with the lug (L).

What is claimed is:

1. A combination handle and winch for winding a strap, said handle combination comprising:

a rotatable cylindrical lug for winding said winch, said lug including at least two holes passing through a cylindrical wall of said lug and said at least two holes being aligned, said handle including a one piece crank including an extension arm portion passing through said two holes to engage said lug, said one piece crank including an axis portion, said one piece crank having a bend portion to connect said extension arm portion with said axis portion such that rotation of the handle will rotate the lug and wind the strap onto the winch, said handle including a handle roller mounted for rotation on said axis portion;

wherein said handle includes an end section mounted on said extension arm portion and wherein the end section includes a cap portion having an enlarged diameter compared to a diameter of said extension arm portion.

2. The combination handle and winch of claim 1 wherein said holes pass through opposite sides of said cylindrical wall.

3. The combination handle and winch of claim 1 wherein said one piece crank is made by bending a single piece of bar stock having a diameter and wherein said holes have a diameter larger than said bar stock diameter.

4. A handle for winding a strap on a winch including a rotatable cylindrical lug for winding said winch about a winch axis, said lug including at least two holes passing through opposite sides of a cylindrical wall of said lug and said at least two holes being aligned radially, the handle comprising;
- a one piece bar stock crank including an extension arm portion for passing through said two holes to engage said lug,
- said one piece bar stock crank including a crank axis portion, said one piece bar stock crank being bent to connect said extension arm portion with said crank axis portion such that rotation of the handle about the crank axis portion will rotate the lug and wind the strap onto the winch,
- wherein said extension arm portion includes an end section and wherein the handle includes a cap welded to the end section and said cap having an enlarged diameter compared to a diameter of said extension arm portion.

5. The handle of claim 4 wherein said one piece bar stock crank is made from a single piece of bar stock bent into a shape including a 180 degree bend between the crank axis portion and said extension arm portion.

6. A combination speed handle and winch for winding a strap, said combination comprising:
- a rotatable cylindrical lug for winding said winch, said lug including at least two holes passing through opposite sides of a cylindrical wall of said lug and said at least two holes being aligned radially,
- said speed handle including a one piece crank including an extension arm portion passing through said two holes to engage said lug, said extension arm portion having a length greater than a diameter of said cylindrical wall,
- said one piece crank including an axis portion, said one piece crank having a bend to connect said extension arm portion with said axis portion such that rotation of the speed handle about the axis portion will rotate the lug and wind the strap onto the winch,
- said speed handle including a cap on an end of said extension arm portion to prevent slipping of the extension arm from the holes during cranking.

7. The combination speed handle and winch of claim 6, wherein said one piece crank is made from a single piece of bar stock having a diameter and wherein said holes have a diameter larger than said bar stock diameter.

8. The combination speed handle and winch of claim 6, said speed handle including a handle roller mounted for rotation on said axis portion.

* * * * *